United States Patent
Bivens et al.

(10) Patent No.: US 10,839,214 B2
(45) Date of Patent: Nov. 17, 2020

(54) AUTOMATED INTENT TO ACTION MAPPING IN AUGMENTED REALITY ENVIRONMENTS

(71) Applicant: INTERNATIONAL BUSINESS MACHINES CORPORATION, Armonk, NY (US)

(72) Inventors: John A. Bivens, Ossining, NY (US); Sinem Guven, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 15/920,194

(22) Filed: Mar. 13, 2018

(65) Prior Publication Data
US 2019/0286906 A1 Sep. 19, 2019

(51) Int. Cl.
*G06K 9/00* (2006.01)
*G06N 5/02* (2006.01)
(Continued)

(52) U.S. Cl.
CPC ......... *G06K 9/00671* (2013.01); *G06F 16/93* (2019.01); *G06K 9/00335* (2013.01);
(Continued)

(58) Field of Classification Search
CPC ........... G06K 9/00671; G06K 9/00335; G06K 9/6282; G06F 16/93; G06F 17/2785;
(Continued)

(56) References Cited

U.S. PATENT DOCUMENTS 6,594,616 B2   7/2003  Zhang et al.
9,514,134 B2  12/2016  King et al.
(Continued)

FOREIGN PATENT DOCUMENTS

WO    2007085303 A1   8/2007

OTHER PUBLICATIONS

Anonymous, "Using Augmented Reality to Enhance Diagnostics, Repair and Assembly," An IP.com Technical Disclosure, Nov. 5, 2012, pg. 1-2, IP.com No. IPCOM000223150D.
(Continued)

*Primary Examiner* — Quoc A Tran
(74) *Attorney, Agent, or Firm* — Steven M. Bouknight

(57) ABSTRACT

A method, computer system, and computer program product for mapping an intent to an action of a user in augmented reality procedures is provided. The present invention may include receiving a user activity from the user and monitoring the received user activity. The present invention may further include matching a concept with the monitored user activity, wherein the matched concept is extracted from an intent database. The present invention may further include identifying a task. The present invention may then include presenting a decision tree, from an intent database, wherein the decision tree comprises a plurality of intended steps to be performed by the user to complete a desired action. The present invention may also include, in response to determining that the user successfully performed an intended step within the plurality of intended steps, presenting a next intended step from the plurality of intended steps from the decision tree.

21 Claims, 6 Drawing Sheets

(51) Int. Cl.
G06F 16/93 (2019.01)
G10L 15/22 (2006.01)
G06N 5/04 (2006.01)
G06N 20/20 (2019.01)
G06K 9/62 (2006.01)
G06F 17/00 (2019.01)

(52) U.S. Cl.
CPC ............. *G06N 5/02* (2013.01); *G06K 9/6282* (2013.01); *G06N 5/04* (2013.01); *G06N 20/20* (2019.01); *G10L 15/22* (2013.01)

(58) Field of Classification Search
CPC .......... G06 5/02; G06N 99/005; G06N 5/04; G06N 20/20; G10L 15/22
See application file for complete search history.

(56) References Cited

U.S. PATENT DOCUMENTS

| 9,529,513 | B2 | 12/2016 | Balan et al. | |
|---|---|---|---|---|
| 9,530,252 | B2 | 12/2016 | Poulos et al. | |
| 2008/0100570 | A1 | 5/2008 | Friedrich et al. | |
| 2016/0117863 | A1 | 4/2016 | Pugazhendhi et al. | |
| 2017/0095732 | A1* | 4/2017 | Ghaffari | A63F 13/211 |
| 2017/0316610 | A1 | 11/2017 | Lin et al. | |
| 2018/0329512 | A1* | 11/2018 | Liao | G10L 15/265 |

OTHER PUBLICATIONS

Anonymous, "Method and System for Providing Maintenance Assistance to a User by Using Augmented Reality and Related Devices," An IP.com Technical Disclosure, Apr. 16, 2014, pg. 1-2, IP.com No. IPCOM000236265D.

Antifakos et al., "Proactive Instructions for Furniture Assembly," UbiComp 2002: International Conference on Ubiquitous Computing, 2002, 10 Pages, LNCS vol. 2498, Springer, Berlin, Heidelberg.

Henderson et al., "Augmented Reality in the Psychomotor Phase of a Procedural Task," IEEE International Symposium on Mixed and Augmented Reality 2011 Science and Technolgy Proceedings, Oct. 26-29, 2011, p. 191-200, Basel, Switzerland.

Khuong et al., "The Effectiveness of an AR-based Context-Aware Assembly Support System in Object Assembly," IEEE Virtual Reality 2014, Mar. 29-Apr. 2, 2014, p. 57-62, Minneapolis, Minnesota, USA.

Kollatsch et al., "Mobile Augmented Reality based Monitoring of Assembly Lines," CIRP Conference on Assembly Systems and Technologies, 2014, p. 246-251, Elsevier B.V.

Mell et al., "The NIST Definition of Cloud Computing," National Institute of Standards and Technology, Sep. 2011, p. 1-3, Special Publication 800-145.

Mura et al., "An Integrated Environment Based on Augmented Reality and Sensing Device for Manual Assembly Workstations," 48th CIRP Conference on Manufacturing Systems (CIRP CMS), 2015, p. 340-345, Elsevier B.V.

Neumann et al., "Cognitive, Performance, and Systems Issues for Augmented Reality Applications in Manufacturing and Maintenance," Proceedings of the IEEE Virtual Reality Annual International Symposium, 1998, 8 Pages.

Werrlich, "Augmented Reality for Engine Assembly Workstations: a Human-centered Design," 16th International conference on Knowledge Technologies and Data-Driven Business (i-Know 2016), Oct. 19, 2016, 5 Pages, Graz, Austria.

Yuan et al., "Assembly Guidance in Augmented Reality Environments Using a Virtual Interactive Tool," Innovation in Manufacturing Systems and Technology (IMST), 2005, 9 Pages, Singapore—MIT Alliance.

Zauner et al., "Authoring of a Mixed Reality Assembly Instructor for Hierarchical Structures," Proceedings of the Second IEEE and ACM International Symposium on Mixed and Augmented Reality (ISMAR '03), 2003, 10 Pages, IEEE Computer Society.

* cited by examiner

AUTOMATED INTENT TO ACTION MAPPING IN AUGMENTED REALITY ENVIRONMENTS

BACKGROUND

The present invention relates generally to the field of computing, and more particularly to augmented reality.

Traditionally, augmented reality (AR) research is focused on haptic systems (i.e., the use of sense of touch in a user interface design to provide information to an end user) to provide feedback to users. However, building feedback systems to inform users whether their interaction (i.e., action) with the real world or the virtual augmentations are aligned with the expectations (i.e., intent) of a cognitive AR system remains unexplored.

SUMMARY

Embodiments of the present invention disclose a method, computer system, and a computer program product for mapping an intent to an action of a user in augmented reality procedures. The present invention may include receiving a user activity from the user. The present invention may then include monitoring the received user activity. The present invention may further include matching a concept with the monitored user activity, wherein the matched concept is extracted from an intent database, wherein natural language processing is utilized to derive the extracted concept from a plurality of knowledge documents and a plurality of relevant sources. The present invention may further include identifying a task based on the extracted concept and monitored user activity. The present invention may then include presenting a decision tree, from an intent database, based on the extracted concepts and identified task, wherein the decision tree comprises a plurality of intended steps to be performed by the user to complete a desired action. The present invention may also include, in response to determining that the user successfully performed an intended step within the plurality of intended steps, presenting a next intended step from the plurality of intended steps from the presented decision tree.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
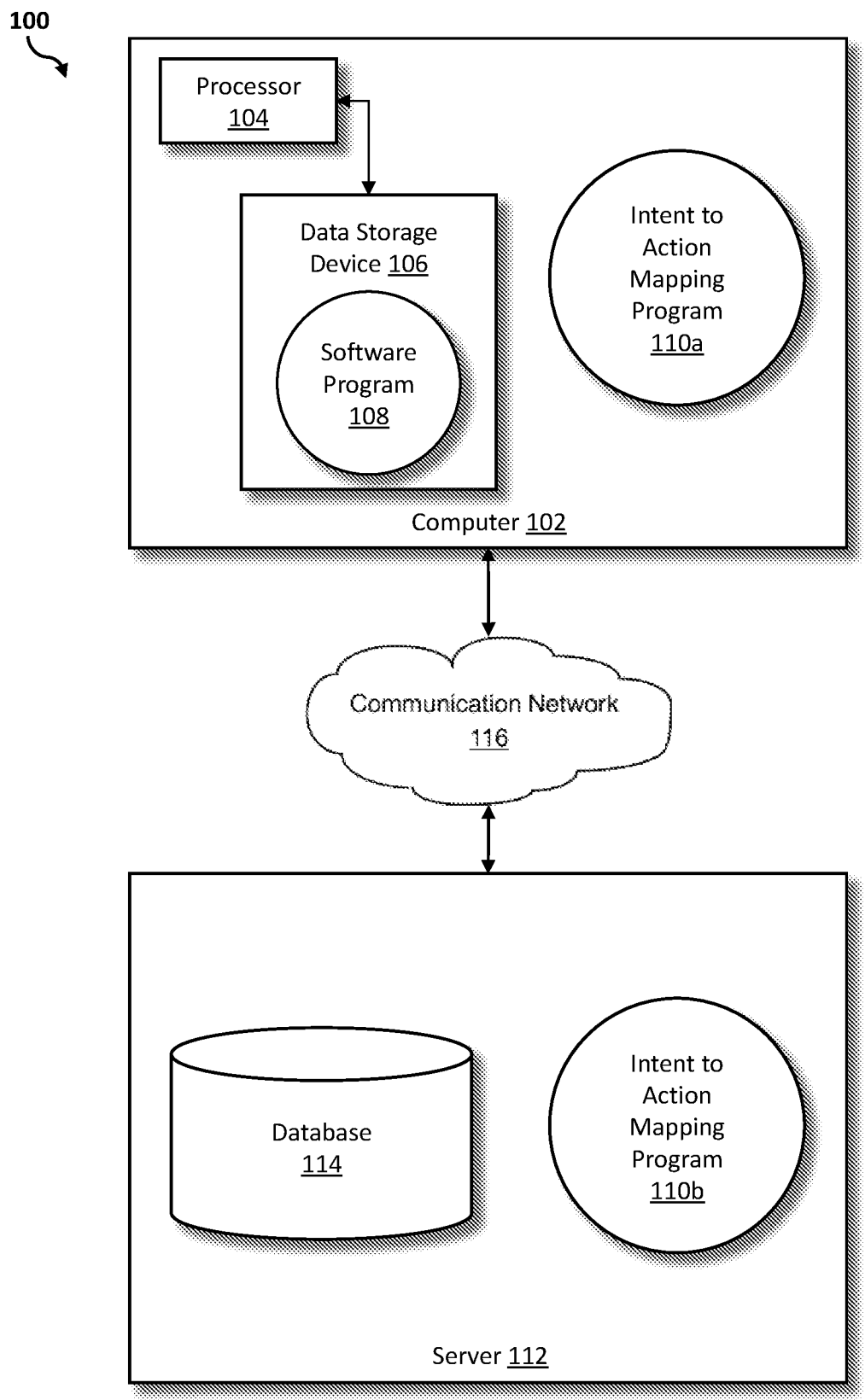
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for mapping an intent to an action of a user in AR procedures. As such, the present embodiment has the capacity to improve the technical field of AR by matching intent to action through providing the ability to understand at what stage of the desired action the user is at (with respect to the intent), verify the steps of the user, and prevent incorrect actions by guiding the user in the case of intent-action mismatch. More specifically, the automated intent to action mapping program may receive and monitor user activity. The automated intent to action mapping program may then extract and match concepts from the monitored user activity thereby leading to the retrieval of a decision tree that matches the extracted concepts. The automated intent to action mapping program may then verify the steps of the user and prevent incorrect actions of the user by determining whether the user is able to follow the given instruction, whether the user is performing the intended step, or whether the user correctly engaged in the step. Depending on the determinations of the automated intent to action mapping program to each of the three questions, the automated intent to action mapping program may provide additional guidance and/or reconstruct the presented decision tree to match the intent of the user based on the actions of the user.

As described previously, traditionally, augmented reality research focused on haptic systems (i.e., the use of sense of touch in a user interface design to provide information to an end user) to provide feedback to users.

However, building feedback systems to inform users whether their interaction (i.e., action) with the real world or the virtual augmentations are aligned with the expectations (i.e., intent) of a cognitive AR system remains unexplored. For example, today, if a technician, in a technical support setting, is utilizing an AR system to receive instructions for repairing a device, the instructions in the form of virtual augmentations are typically presented in a pre-defined order based on a decision tree. To move to the next interaction, the AR system may require the user to provide explicit input to indicate that the user completed a given step (i.e., no intent to action matching). Similarly, if the user engages in a wrong action (e.g., removes an incorrect screw, or presses the wrong button), the current stage of AR systems are incapable of detecting this diversion from the correct path.

Therefore, it may be advantageous to, among other things, suggest a cognitive framework that matches intent to action to understand at what stage of the action the user is at with respect to the intent, verify the steps, and prevent incorrect actions by guiding the user in case of intent-action mismatch. Further, the cognitive framework automatically determines the content when needed, instead of relying on pre-defined decision trees. As such, support may be provided even when the user intentionally or accidentally diverts from the intended plan of action.

According to at least one embodiment, the automated intent to action mapping program may match intent to action to remove explicit user feedback for task completion, provide action verification, and prevent incorrect actions by guiding the user in case of intent-action mismatch. In the present embodiment, the automated intent to action mapping program may automatically determine content instantly instead of relying on pre-defined decision trees by automatically ingesting documents on the related subject matter. As such, the automated intent to action mapping program may support the user when the user accidentally diverts from the intended plan of action.

According to at least one embodiment, the automated intent to action mapping program may build an intent database. The automated intent to action mapping program may first ingest knowledge documents (i.e., documents). The ingested knowledge documents may be converted into decision trees that may be utilized to define the intent database.

According to at least one embodiment, for a given repair task, the technician may be presented, at a given time, with the Nth step of the repair process represented by the decision tree. Unlike traditional approaches, which may require explicit input from the user to understand whether the step N has been completed, the automated intent to action mapping program may monitor user activity through video recognition. The automated intent to action mapping program may then extract concepts from the intent database and may match the extracted concepts to the step and the concept to determine if the action meets the intent. If so, the decision tree may be presented. If the user is unable to perform the intended action, then the automated intent to action mapping program may provide additional guidance through visualizations and verbal queues. If the user engages in an incorrect action, or decides to skip a step, then the automated intent to action mapping program may instantly reconstruct the decision tree to enable continued engagement with the task at hand.

According to at least one embodiment, the automated intent to action mapping program may be utilized for technical support, or may be applied to another domain where intent to action matching for action validation and error prevention is desired.

The present embodiment may include dynamic presentation of the next step by utilizing video recognition to determine that the AR system is in a new intended state, and system verification that all prerequisites are met to move to the intended state (i.e., verifying that previous step was correctly performed). Therefore, the automated intent to action mapping program may detect incorrect or unintended action for error prevention.

The present embodiment may include dynamic reconstruction of a decision tree. If the automated intent to action mapping program detects that a user intentionally or accidentally skips a step (i.e., user lacks pre-required awareness and does not know the state), the automated intent to action mapping program may promptly reconstruct the decision tree to enable continued engagement with the task at hand. According to at least one embodiment, the automated intent to action mapping program may determine that the current decision tree is invalid by comparing the previous state (i.e., steps) with the current state (e.g., incorrect action taken or camera deliberately pointing at something else). The automated intent to action mapping program may determine the remaining steps based on the previous step performed and whether the prerequisite steps are satisfied. The automated intent to action mapping program may then find the instruction that may be performed on the current step and dynamically re-inserts a missed step based on the satisfied prerequisites. If the automated intent to action mapping program is unable to find an instruction, then the automated intent to action mapping program may reverse the previous step, or re-present the missed step appropriately.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an automated intent to action mapping program 110*a*. The networked computer environment 100 may also include a server 112 that is enabled to run an automated intent to action mapping program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the automated intent to action mapping program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the automated intent to action mapping program 110*a*, 110*b* (respectively) to map intent to action in augmented environments. The intent to action mapping method is explained in more detail below with respect to FIGS. 2 and 3.

Figure 2:
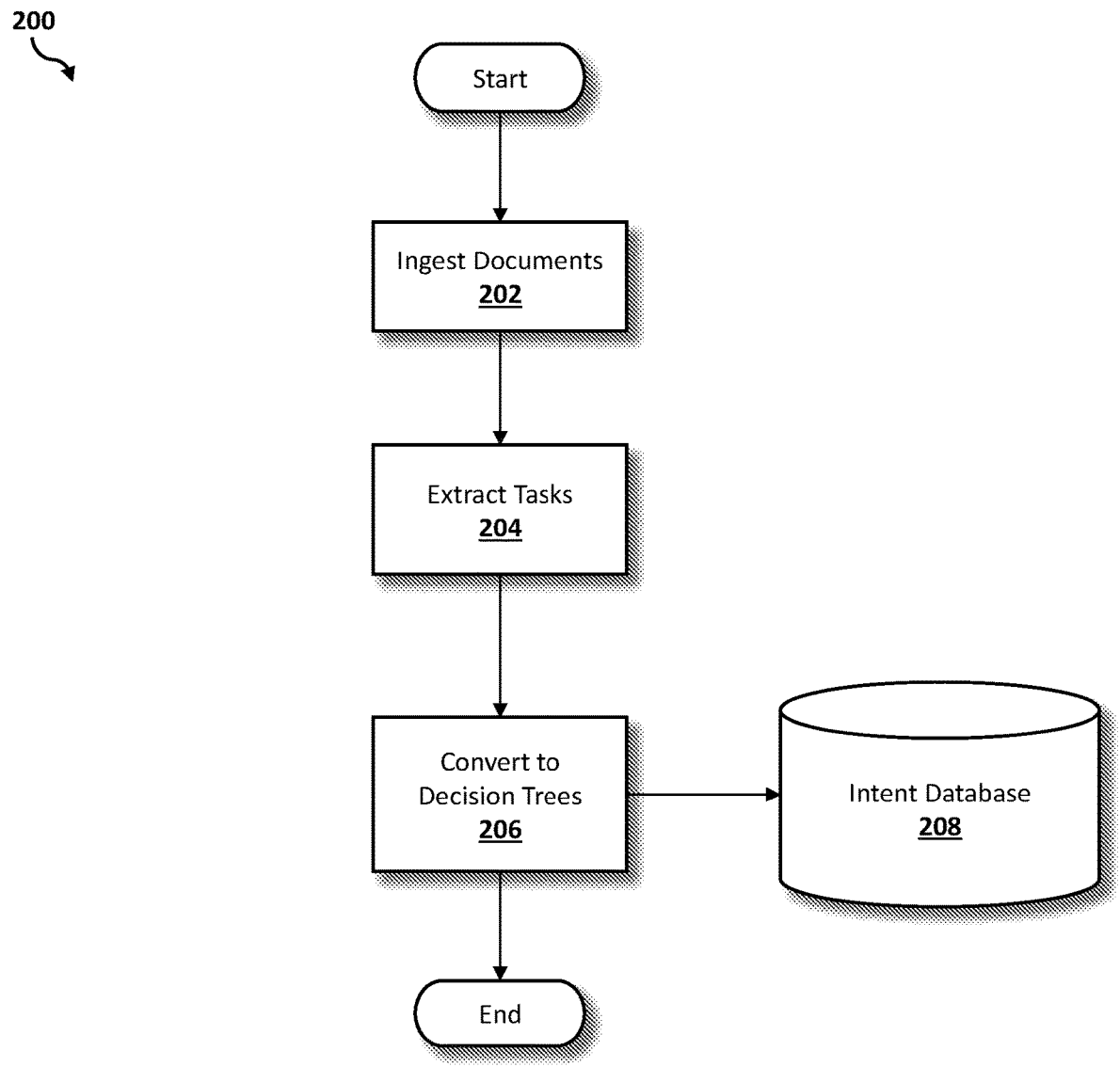
FIG. 2 is an operational flowchart illustrating a process for building an intent database to construct a decision tree according to at least one embodiment.

Referring now to FIG. 2, an operational flowchart illustrating a process for building an intent database 200 used by the automated intent to action mapping program 110a and 110b according to at least one embodiment is depicted.

At 202, a collection of documents is ingested. Documents (i.e., knowledge documents), such as publications, instruction manuals, pamphlets and textbooks, and materials (e.g., written, audio or visual materials) from relevant sources (e.g., credible websites, videos and social media) may be utilized to build an intent database. Documents may be entered into the automated intent to action mapping program 110a, 110b to extract at least one task or activity based on at least one concept expressed in natural language within the documents. Publications, instruction manuals, pamphlets and textbooks, for example, may be uploaded into the automated intent to action mapping program 110a, 110b. Thereafter, these documents may be searched for a task or an activity (e.g., troubleshooting, repairs, installation). The task and associated necessary steps to complete the task may be extracted from the documents. Then, the extracted tasks and associated steps may be converted into a decision tree.

For example, the user works to assemble a large modular entertainment system wall in the user's home. The user downloads the manufacturer's instruction manual from the manufacturer's website, and uploads the manufacturer's instruction manual into the automated intent to action mapping program 110a, 110b.

In the present embodiment, the automated intent to action mapping program 110a, 110b may ingest an infinite number of documents. When an identified task is included in more than one ingested document, the automated intent to action mapping program 110a, 110b may consolidate the associated steps and eliminate duplicity (e.g., repetitive or overlapping steps) connected to the identified task.

Then, at 204, tasks are extracted from the ingested documents. The automated intent to action mapping program 110a, 110b may parse through each sentence and diagram within the documents to identify tasks by utilizing a known document extractor. Each of the identified tasks may be further analyzed to determine the necessary steps to complete the specific task.

Continuing the previous example, the automated intent to action mapping program 110a, 110b extracts the tasks in the uploaded instruction manual, which includes text and diagrams associated with identified tasks to assemble each of two side panels included in the large modular entertainment system wall, and multiple center sections for a television, subwoofer and center speaker. Additional identified tasks extracted include tasks related to troubleshooting and repairs to various portions of the large modular entertainment system wall, the alternate assembly for a wired audio system with surround sound, and the assembly of an entertainment system with a television over 65 inches.

Then, at 206, the extracted tasks and associated steps from the ingested documents are converted into at least one decision tree, and the constructed decision tree is stored in the intent database 208. The automated intent to action mapping program 110a, 110b may utilize a known automated formatting engine to convert the extracted tasks and necessary steps associated with the completion of the task into steps (i.e., augmented procedures) in a decision tree. The extracted tasks and associated steps may then be indexed by concepts associated with the tasks and stored in the intent database 208.

The decision tree may be utilized as an easy to follow and understand representation to classify examples on how to complete the specific task based on the concepts identified or the activity performed by the user. A decision tree may include three main parts: a root node, leaf nodes and branches. The root node may be the starting point of the tree, and both the root and leaf nodes may include an augmented procedure (i.e., step) to be completed in chronological order. The branches may be arrows connecting nodes that show a flow from step to step based on the user activity. At least one node extends from each node. Two or more nodes may, however, extend from each node depending on whether there are multiple possible steps based on the monitored user activity.

Continuing the previous example, the automated intent to action mapping program 110a, 110b utilizes an automated formatting engine to convert the identified tasks with the associated steps to assemble the two side panels of the large modular entertainment system wall, the center sections for the television, subwoofer and center speaker, the wired audio system with surround sound, and entertainment system with a television over 65 inches, as well as troubleshooting and repair of various portions of the large modular entertainment system wall into decision trees. Since each identified task, such as assembling each of the side panels or center sections, are separate tasks converted into separate decision trees, the instruction manual generates 11 different decision trees. Each step identified in the instruction manual is a node in the appropriate decision tree, with the first step (or Step 1) as the root node, and the following steps (Step 2, Step 3, etc.) as leaf nodes. Each of the nodes are connected by branches that flow from step to step.

In the present embodiment, automated intent to action mapping program 110a, 110b may include the prerequisites for each step, as well as an intended next (i.e., target) step with the appropriate node of the decision tree. Additionally, the decision tree for the prerequisite tasks may be included in chronological order with the appropriate decision tree. For example, if the user should assemble to the center sections before assembling the side panels, then the automated intent to action mapping program 110a, 110b may save the decision trees for each task where the assembly of the center sections are a prerequisite for the assembly of the side panels.

In the present embodiment, diagrams related to the tasks may be included with the appropriate step. The automated intent to action mapping program 110a, 110b may store the appropriate diagram with the applicable node of the decision tree in the intent database 208.

Figure 3:
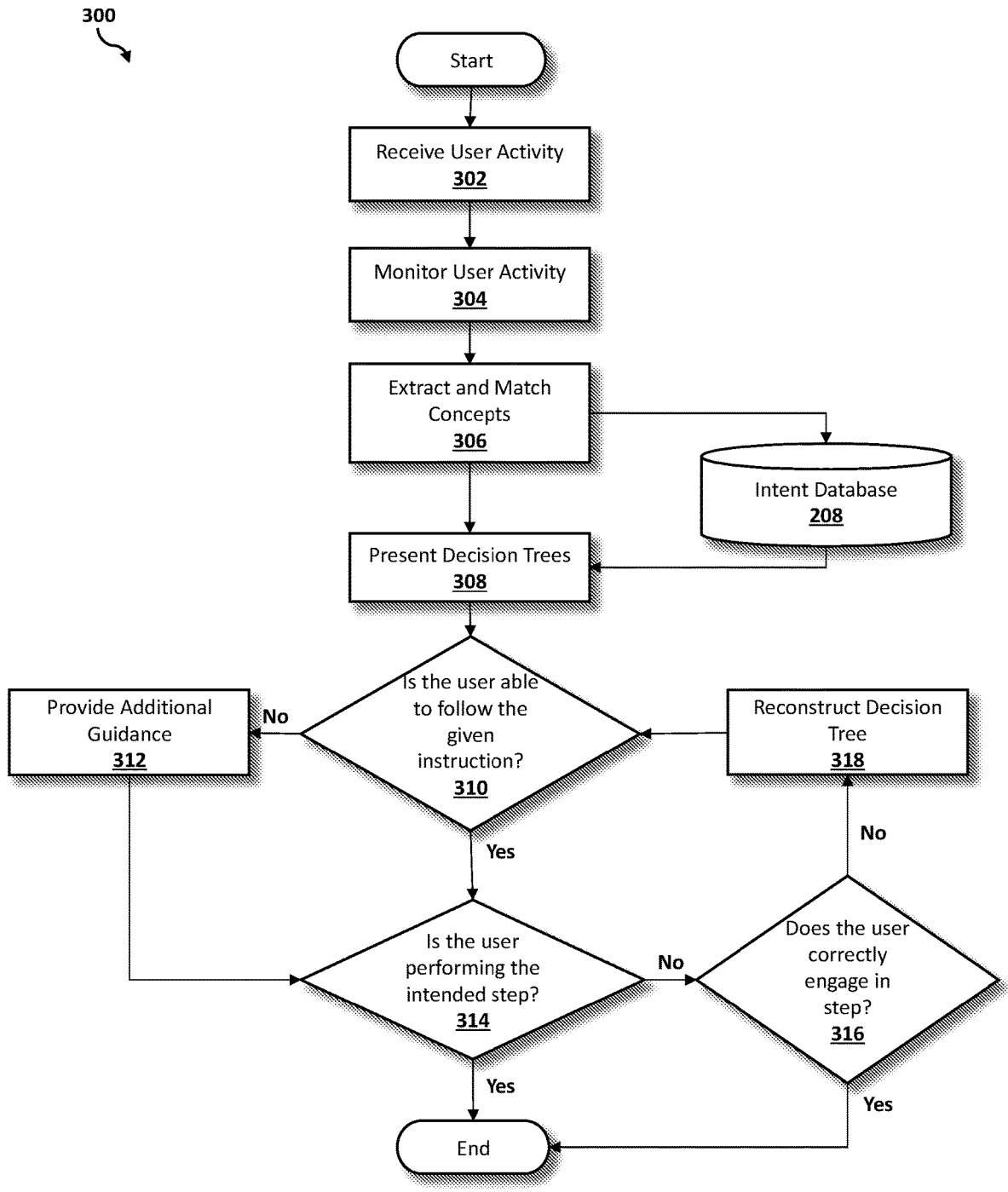
FIG. 3 is an operational flowchart illustrating a process for mapping intent to action in augmented reality environments according to at least one embodiment.

Referring now to FIG. 3, an operational flowchart illustrating the exemplary intent to action mapping process 300 used by the automated intent to action mapping program 110a and 110b according to at least one embodiment is depicted.

At 302, user activity is received. Using a software program 108 on the user's device (e.g., user's computer 102), user activity may be detected as input into the automated intent to action mapping program 110a, 110b via communications network 116. The user activity may be detected and then received by the automated intent to action mapping program 110a, 110b. The user, for example, may turn on or activate the automated intent to action mapping program 110a, 110b, which may cause the automated intent to action mapping program 110a, 110b to detect and receive user activity. Additionally, the user may utilize an AR device (e.g., glasses, glove), or a form of wearable device to run the software program 108 to detect user activity.

For example, a user, who is a skilled computer technician, is replacing the processor (i.e., CPU) of a desktop of the user. The user already started the process of removing the old processor, when the user began having trouble removing the heat sink, which has to be removed to access the processor. As such, the user turned on the automated intent to action mapping program 110a, 110b to assist with the removal of the heat sink.

Then, at 304, user activity is monitored. The automated intent to action mapping program 110a, 110b may monitor user activity by utilizing a recognition software (e.g., video, computer vision and graphics) or a three-dimensional (3D) tracking software. For the recognition software and 3D tracking, the automated intent to action mapping program 110a, 110b may utilize, for example, cameras, at least one recorders, LED controllers, calibration tools, position and motion tracking sensors, and visual marker sets. The user's hands and tools (e.g., screwdriver, wrench) may be tracked, for example, in 3D tracking, using position and motion tracking sensors or gloves and the automated intent to action mapping program 110a, 110b may determine the intended hardware item through the natural language processing analysis of the current step. The recognition software, for example, may be utilized to determine the step that the user is performing, thereby suggesting the step that the automated intent to action mapping program 110a, 110b starts at. By utilizing the recognition and 3D tracking software in which the user's interactions are compared with the intended hardware item and associated intended actions on the hardware item, the automated intent to action mapping program 110a, 110b determines incorrect actions by the user and validates correct actions.

Additionally, the automated intent to action mapping program 110a, 110b may recognize the user's tools and the actions of the user from previous offline video training and 3D labels. Prior to starting the automated intent to action mapping program 110a, 110b, captured videos or images related to the hardware and apparatus to be utilized by the user may be used to train recognition algorithms to recognize the hardware or apparatus utilized by the user, thereby generating training data. The training data generated from the offline training may be stored on a cloud storage service, and uploaded into the automated intent to action mapping program 110a, 110b via communication network 116 when a specific task may be completed by the user. The step completed in real-time may rely on the offline training to recognize the hardware and apparatus utilized by the user to map the user's intent with the actions of the user.

Continuing the previous example, before the automated intent to action mapping program 110a, 110b receives the user activity, the automated intent to action mapping program 110a, 110b performs offline training associated with the installation of a new processor based on recorded videos of the process of installing a new processor with the appropriate hardware and apparatus. The training data generated from the offline training was uploaded into cloud storage. Afterwards, the automated intent to action mapping program 110a, 110b utilizes a camera to detect and monitor the user attempting to remove a heat sink, and the screwdriver that the user utilizes to unscrew the screw to the left of the heat sink is tracked by the same camera associated with the automated intent to action mapping program 110a, 110b.

Then, at 306, a concept is extracted and matched to the monitored user activity. The concept may be extracted from at least one knowledge document or relevant source and corresponding tasks may be retrieved from the intent database 208. The extracted concept may be utilized to form the basic component for mapping knowledge article content to video content. Since multiple tasks may be associated with the extracted concept, the automated intent to action mapping program 110a, 110b may analyze the steps before and after the step, as well as the prerequisites for the step associated with the concept from the intent database 208, to determine whether the action matches the intent. The automated intent to action mapping program 110a, 110b may then determine which corresponding task associated with the concept matches the monitored user activity.

Additionally, based on the monitored user activity and the concept, the automated intent to action mapping program 110a, 110b may retrieve the training data associated with the concept and the corresponding task from the cloud storage.

Continuing the previous example, the automated intent to action mapping program 110a, 110b recognizes the heat sink, the screw to the left of the heat sink, the processor, and the additional parts of the processor surrounding the heat sink. As such, the automated intent to action mapping program 110a, 110b matches the monitored user activity of removing a screw to the left of a heat sink in a processor to a step on a decision tree, stored in the intent database 208, for removing a heat sink in a processor. Additionally, the automated intent to action mapping program 110a, 110b determines that the user is at Step 15 of that decision tree on removing the heat sink in the processor. The automated intent to action mapping program 110a, 110b further determines that removal of the heat sink is a prerequisite step for the removal of a processor, and that the user performed the other prerequisite steps, such as opening the cover of the hardware item.

In the present embodiment, the automated intent to action mapping program 110a, 110b may utilize natural language processing to extract the concept. In addition, videos may be trained based on the same concept associated with a corresponding task.

In the present embodiment, if the automated intent to action mapping program 110a, 110b is unable to match a concept and corresponding task from the intent database 208 with the monitored user activity, then the automated intent to action mapping program 110a, 110b may present an error message or guide the user to point the camera to the intended concept. The automated intent to action mapping program 110a, 110b may then continue to monitor the user activity until the automated intent to action mapping program 110a, 110b matches the concept with the monitored user activity.

Then, at 308, a decision tree from the intent database 208 is presented to the user. Based on the monitored user activity and the concept from the intent database 208 that matches that monitored user activity, the automated intent to action mapping program 110a, 110b may present a decision tree, via client computer 102, which directly relates to the step which the user is currently engaged in. The root node may be the current procedure step that the user is engaged in based on the monitored user activity. Each node may include the number of the step (e.g., Step 1, Step 2) and a brief description of the step. The branches may connect the root node to the leaf nodes, which may be the next steps. If there are multiple possible next steps, then the automated intent to action mapping program 110a, 110b may present each of those steps in a separate leaf node.

Continuing the previous example, the automated intent to action mapping program 110a, 110b presents a decision tree on removing a heat sink in a processor on the user's mobile device, where the decision tree is presented on the screen of the user's mobile device with a graphical user interface (GUI). The automated intent to action mapping program 110a, 110b presents the leaf node with "Step 15—remove the screw to the left of the heat sink," which is the intended step to be performed by the user.

In the present embodiment, the automated intent to action mapping program 110a, 110b indicates the current step that the user is performing (e.g., presenting exclusively the relevant step, enlarging, highlighting or changing the color of the node with the intended step, or lighting the color of the other steps). Therefore, the user may easily identify the current step in the decision tree, as well as review the preceding and following steps in the same decision tree.

In the present embodiment, if the automated intent to action mapping program 110a, 110b fails to present a decision tree that matches the determined concept and identified task, then an error message may be presented to the user. Even though the automated intent to action mapping program 110a, 110b presents the error message, the automated intent to action mapping program 110a, 110b may continue to monitor the user activity. If the user activity matches a concept or identified task even after the error message was presented, the automated intent to action mapping program 110a, 110b may automatically present the appropriate decision tree and the error message may disappear without any explicit input from the user.

Then, at 310, the automated intent to action mapping program 110a, 110b determines whether the user is able to follow the given instruction. The automated intent to action mapping program 110a, 110b may verify the steps of the user by determining if the user is performing an incorrect or unintended action, then the automated intent to action mapping program 110a, 110b may determine what the user is interacting with as compared to what the user should be interacting with in the real world. Based on the monitored user activity, the automated intent to action mapping program 110a, 110b may first utilize the recognition software to determine whether the user is able to follow the given instruction. Depending on whether the steps of the user match the desired action, the user may be prompted to move to the next step or may be provided additional guidance.

If the automated intent to action mapping program 110a, 110b determines that the user is unable to follow the given instruction at 310, then the automated intent to action mapping program 110a, 110b provides additional guidance at 312. Based on the current step that the user is unable to follow, the automated intent to action mapping program 110a, 110b may prompt the user with additional instructions. The automated intent to action mapping program 110a, 110b may, for example, reword or simplify the given instruction, or provide additional visualizations for the user to easily understand and follow.

Continuing the previous example, after three minutes, the user is unable to remove the screw to the left of the heat sink in the processor. As such, the automated intent to action mapping program 110a, 110b provides additional guidance to the user by including diagrams with the exact location of the screw next to the heat sink. The diagram includes a yellow arrow to indicate the location of the screw. The diagram also displays a warning that cautions the user against bending the metal casing on top of the heat sink.

In the present embodiment, the automated intent to action mapping program 110a, 110b may utilize auditory means or verbal queues (e.g., computer generated voice) to provide additional instruction or guidance for the current step.

If the automated intent to action mapping program 110a, 110b determines that the user is able to follow the given instruction at 310, or the automated intent to action mapping program 110a, 110b provided additional guidance at 312, then the automated intent to action mapping program 110a, 110b determines if the user is performing the intended step at 314. By utilizing 3D tracking of the user's tools and video recognition, the automated intent to action mapping program 110a, 110b may continue to verify that the user is performing the desired action. The automated intent to action mapping program 110a, 110b, from the offline training, may be aware of how the intended step may look or the tools that may be used to perform the current step.

Continuing the previous example, the automated intent to action mapping program 110a, 110b continues to monitor the user activity to verify that the user's screwdriver is engaged with the correct screw to the left of the heat sink and has successfully removed the appropriate screw to the left of the heat sink. This is as simple as detecting the intersection of the bounding boxes of the intended screw and the screwdriver through 3D tracking and video recognition.

If the automated intent to action mapping program 110a, 110b determined that the user is performing the intended step at 314, then the automated intent to action mapping program 110a, 110b ends the process for this particular step and the automated intent to action mapping program 110a, 110b may proceed to the next step in the identified task. By utilizing the 3D tracking of the user's tools and recognition software, the automated intent to action mapping program 110a, 110b may determine that the user performed the current step and utilized the appropriate tools to perform the step. If the automated intent to action mapping program 110a, 110b determines that the user performed the intended step and the prerequisites, then the automated intent to action mapping program 110a, 110b may move to the next intended step.

Continuing the previous example, if the user successfully removed the appropriate screw to the left of the heat sink, then the automated intent to action mapping program 110a, 110b confirms that the user completed Step 15. The automated intent to action mapping program 110a, 110b may then proceed to Step 16, which states "Step 16—remove the heat sink," for the user.

In the present embodiment, if the automated intent to action mapping program 110a, 110b determines that the user fails to satisfy the prerequisites for the current step, then the user will not be presented the instructions for the current step at 314.

If, however, the automated intent to action mapping program 110a, 110b determines that the user is not performing the intended step at 314, then the automated intent to action mapping program 110a, 110b determines if the user is correctly engaged in the step at 316. By utilizing 3D tracking on the user's tools and the recognition software, the automated intent to action mapping program 110a, 110b may determine that the user is correctly engaged in the intended step. Even though the user may have yet to perform the intended step, the user may be correctly engaged in the step. In such instance, the user may, in time, complete the intended step.

Continuing the previous example, the user was unable to successfully remove the screw to the left of the heat sink. As such, the automated intent to action mapping program 110a, 110b utilizes the 3D tracking and video recognition to determine whether the user is correctly attempting to remove the screw in Step 15.

If the user correctly engages in the step at 316, then the automated intent to action mapping program 110a, 110b ends the process for this particular step and the automated intent to action mapping program 110a, 110b may proceed to the next step in the identified task. The automated intent to action mapping program 110a, 110b may determine that the user is correctly performing the intended step, then the automated intent to action mapping program 110a, 110b may provide the user with additional time to complete the step and then may proceed to the next intended step.

Continuing the previous example, if the user was correctly attempting to remove the screw to the left the heat sink, then the automated intent to action mapping program 110a, 110b will continue to monitor the user activity and provide the user with additional time to remove the screw. After which, the automated intent to action mapping program 110a, 110b proceeds to Step 16 by presenting the next node on the screen of the user's mobile device, which states "Step 16—remove the heat sink," for the user.

If, however, the automated intent to action mapping program 110a, 110b determines that the user is not correctly engaged in the step at 316, then the automated intent to action mapping program 110a, 110b reconstructs the decision tree at 318, and returns to 310 to determine if the user is able to follow the given instruction in the reconstructed decision tree at 318. The automated intent to action mapping program 110a, 110b may determine that the failure of the user to perform the intended step may be the result of the user's inability to follow the given instruction even after additional guidance at 312, or the user's intentional decision to skip the intended step. Therefore, the user may be incorrectly engaged in the step. The automated intent to action mapping program 110a, 110b may then reconstruct the decision tree at 318. If the user is intentionally skipping the intended skip, then the automated intent to action mapping program 110a, 110b may detect the step that the user is at and reconstruct the decision tree to match where the user is at. If the automated intent to action mapping program 110a, 110b determines that the user is unable to follow the given instruction, then the automated intent to action mapping program 110a, 110b may reconstruct the decision tree to simplify and target the issues that the user is experiencing while performing the intended step. Regardless of the reason for the user incorrectly engaging in the step, the automated intent to action mapping program 110a, 110b may determine that the current decision tree is invalid and may reconstruct the decision tree to match the user's intent and action to complete the identified task.

Continuing the previous example, the automated intent to action mapping program 110a, 110b determines that the user having difficult removing the screw. Based on the 3D tracking, the automated intent to action mapping program 110a, 110b noticed that the user is attempting to remove the screw by turning the screw to the right thereby tightening the screw as opposed to loosening the screw for removal. As such, the automated intent to action mapping program 110a, 110b rebuilds the decision tree to provide instructions on how to turn the screwdriver to successfully loosen the screw for removal.

In the present embodiment, the automated intent to action mapping program 110a, 110b may detect an incorrect or unintended action. Utilizing 3D tracking, the user's tools may be tracked, and the offline video training and recognition software may be utilized to teach the automated intent to action mapping program 110a, 110b how to perform specific tasks or activities. For example, if the user's tools 3D bounding box intersects with the intended hardware item's bounding box, then the automated intent to action mapping program 110a, 110b may assume that the tool is interacting with the hardware item. If, however, the user's tool is interacting with an unintended hardware item, then, until the interaction is approved, an error is shown to warn the user.

In the present embodiment, the automated intent to action mapping program 110a, 110b may compare the previous intended step with the current step to determine if an incorrect action may have been taken, or the camera is deliberately pointing at an unintended item. Since the automated intent to action mapping program 110a, 110b already determined the previous step, satisfied and unsatisfied prerequisites, and the remaining steps, the automated intent to action mapping program 110a, 110b may dynamically re-insert a missing step based on the prerequisites satisfied.

In the present embodiment, if the automated intent to action mapping program 110a, 110b is unable to find an appropriate instruction for the user, then the automated intent to action mapping program 110a, 110b may reverse the previous step, or re-present the missed step appropriately.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
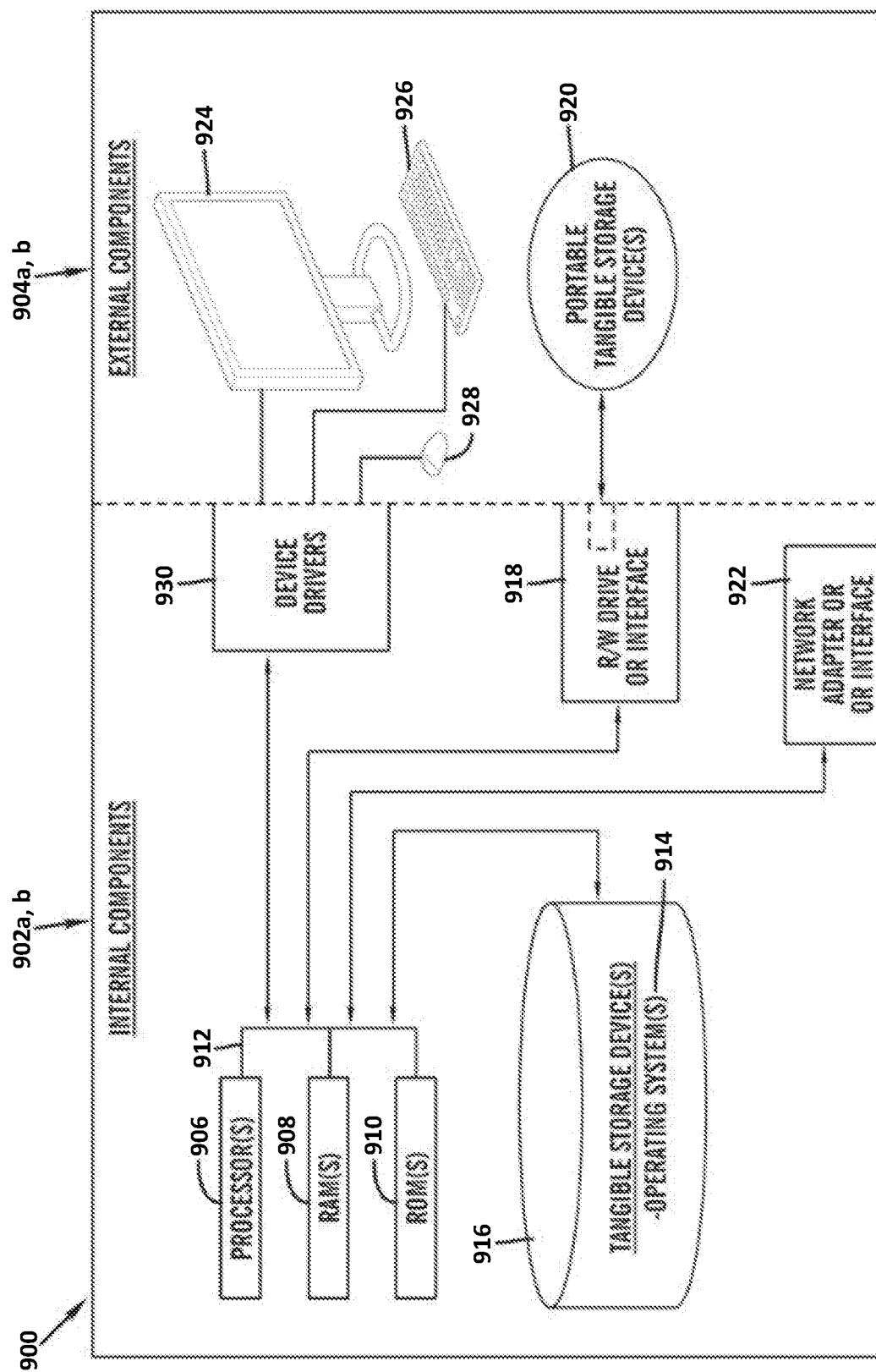
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the automated intent to action mapping program 110a in client computer 102, and the automated intent to action mapping program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the automated intent to action mapping program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the automated intent to action mapping program 110a in client computer 102 and the automated intent to action mapping program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the automated intent to action mapping program 110a in client computer 102 and the automated intent to action mapping program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
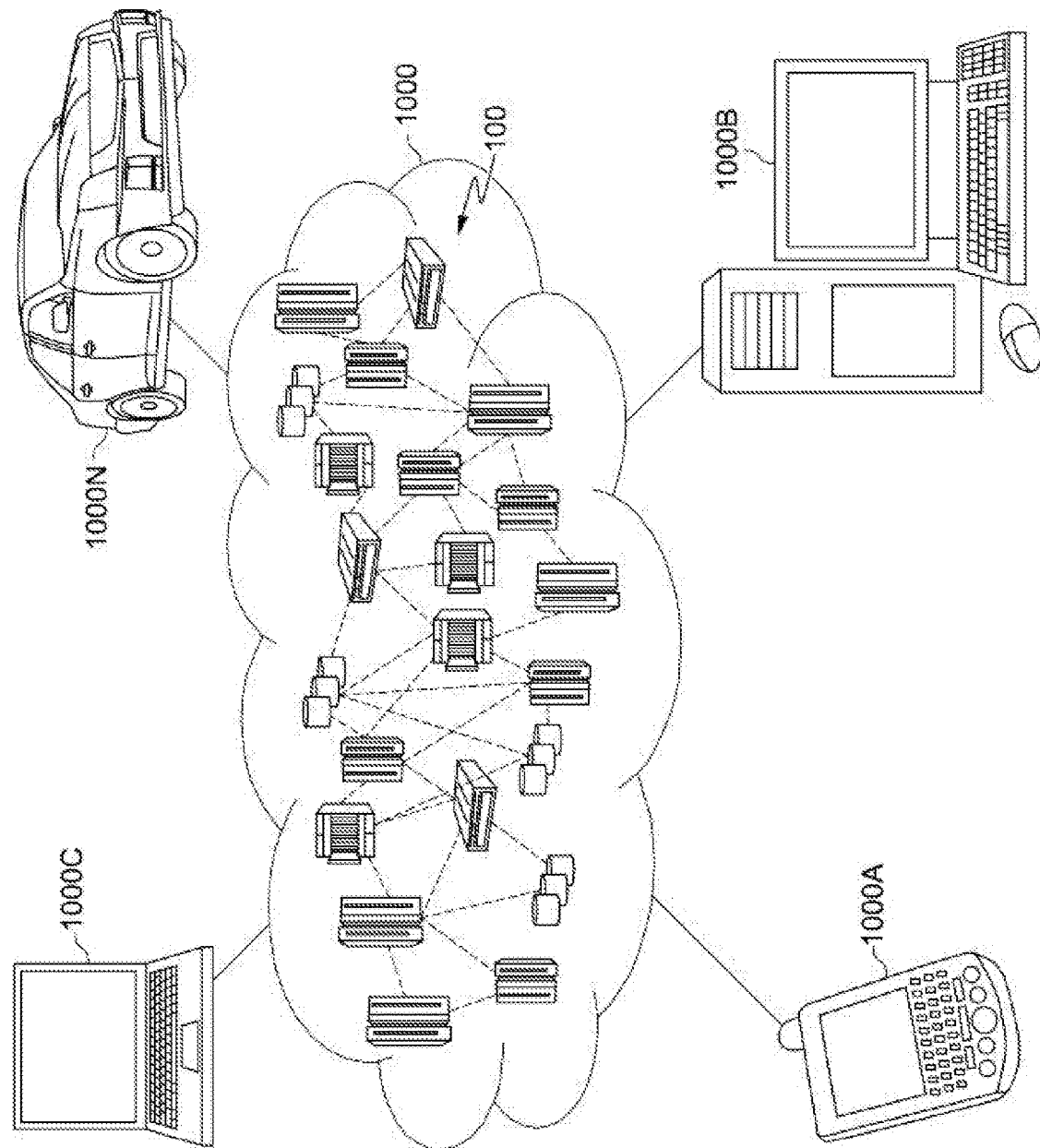
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
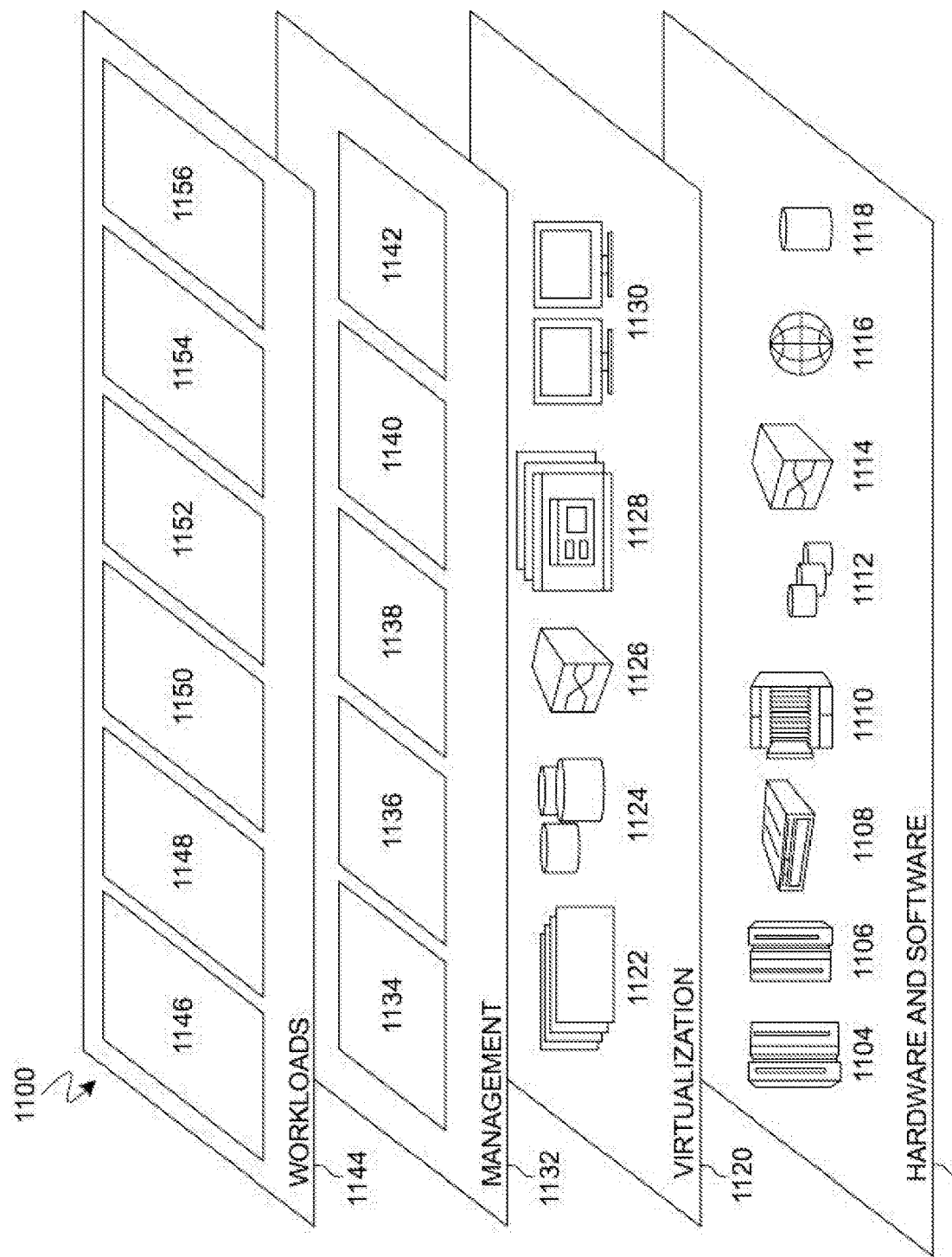
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and intent to action mapping 1156. An automated intent to action mapping program 110a, 110b provides a way to map intent to action in augmented reality environments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for mapping an intent to an action of a user in augmented reality procedures, the method comprising:
    receiving a user activity from the user;
    monitoring the received user activity;
    matching a concept with the monitored user activity, wherein the matched concept is extracted from an intent database, wherein natural language processing is utilized to derive the extracted concept from a plurality of knowledge documents and a plurality of relevant sources;
    identifying a task based on the extracted concept and the monitored user activity;
    presenting a decision tree, from an intent database, based on the extracted concept and identified task, wherein the decision tree comprises of a plurality of intended steps to be performed by the user to complete a desired action;
    in response to determining that the user successfully performed an intended step within the plurality of intended steps, presenting a next intended step from the plurality of intended steps from the presented decision tree; and
    in response to determining that the user is unable to follow at least one given instruction from the intended step, providing at least one form of additional guidance to the user for performing the intended step.

2. The method of claim 1, wherein monitoring the received user activity, further comprises:
    utilizing a video recognition and three-dimensional tracking software.

3. The method of claim 1, wherein the at least one form of additional guidance comprises a visual aid, a verbal aid, or a plurality of textual data.

4. The method of claim 1, further comprising:
determining that the user is unable to perform the intended step from the plurality of intended steps;
determining that the user is incorrectly engaged in the intended step; and
reconstructing the decision tree, wherein the reconstructed decision tree is associated with an actual intent and a desired action of the user.

5. The method of claim 1, further comprising:
ingesting at least one document from the plurality of knowledge documents and the plurality of relevant sources;
extracting at least one task from the ingested document;
converting the extracted task into a decision tree; and
storing the decision tree in the intent database.

6. The method of claim 2, further comprising:
monitoring a plurality of user's tools by utilizing three-dimensional tracking software; and
determining the intended step of the user based on the monitored plurality of user's tools and recognition software, wherein a piece of training data based on offline training was created for the recognition software.

7. The method of claim 6, further comprising:
creating offline training for a plurality of general tasks;
generating training data associated with the plurality of general tasks from the created offline training;
comparing the created offline training to the monitored user activity; and
associating the intent of the user with the desired action based on the compared offline training and monitored user activity.

8. A computer system for mapping an intent to an action of a user in augmented reality procedures, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving a user activity from the user;
monitoring the received user activity;
matching a concept with the monitored user activity, wherein the matched concept is extracted from an intent database, wherein natural language processing is utilized to derive the extracted concept from a plurality of knowledge documents and a plurality of relevant sources;
identifying a task based on the extracted concept and the monitored user activity;
presenting a decision tree, from an intent database, based on the extracted concept and identified task, wherein the decision tree comprises of a plurality of intended steps to be performed by the user to complete a desired action;
in response to determining that the user successfully performed an intended step within the plurality of intended steps, presenting a next intended step from the plurality of intended steps from the presented decision tree; and
in response to determining that the user is unable to follow at least one given instruction from the intended step, providing at least one form of additional guidance to the user for performing the intended step.

9. The computer system of claim 8, wherein monitoring the received user activity, further comprises:
utilizing a video recognition and three-dimensional tracking software.

10. The computer system of claim 8, wherein the at least one form of additional guidance comprises a visual aid, a verbal aid, or a plurality of textual data.

11. The computer system of claim 8, further comprising:
determining that the user is unable to perform the intended step from the plurality of intended steps;
determining that the user is incorrectly engaged in the intended step; and
reconstructing the decision tree, wherein the reconstructed decision tree is associated with an actual intent and a desired action of the user.

12. The computer system of claim 8, further comprising:
ingesting at least one document from the plurality of knowledge documents and the plurality of relevant sources;
extracting at least one task from the ingested document;
converting the extracted task into a decision tree; and
storing the decision tree in the intent database.

13. The computer system of claim 9, further comprising:
monitoring a plurality of user's tools by utilizing three-dimensional tracking software; and
determining the intended step of the user based on the monitored plurality of user's tools and recognition software, wherein a piece of training data based on offline training was created for the recognition software.

14. The computer system of claim 13, further comprising:
creating offline training for a plurality of general tasks;
generating training data associated with the plurality of general tasks from the created offline training;
comparing the created offline training to the monitored user activity; and
associating the intent of the user with the desired action based on the compared offline training and monitored user activity.

15. A computer program product for mapping an intent to an action of a user in augmented reality procedures, comprising:
one or more computer-readable storage tangible media and program instructions stored on at least one of the one or more computer-readable tangible storage media, the program instructions executable by a processor to cause the processor to perform a method comprising:
receiving a user activity from the user;
monitoring the received user activity;
matching a concept with the monitored user activity, wherein the matched concept is extracted from an intent database, wherein natural language processing is utilized to derive the extracted concept from a plurality of knowledge documents and a plurality of relevant sources;
identifying a task based on the extracted concept and the monitored user activity;
presenting a decision tree, from an intent database, based on the extracted concept and identified task, wherein the decision tree comprises of a plurality of intended steps to be performed by the user to complete a desired action;
in response to determining that the user successfully performed an intended step within the plurality of intended steps, presenting a next intended step from the plurality of intended steps from the presented decision tree; and in response to determining that the user is unable to follow at least one given instruction from the intended step, providing at least one form of additional guidance to the user for performing the intended step.

16. The computer program product of claim 15, wherein monitoring the received user activity, further comprises:
utilizing a video recognition and three-dimensional tracking software.

17. The computer program product of claim 15, wherein the at least one form of additional guidance comprises a visual aid, a verbal aid, or a plurality of textual data.

18. The computer program product of claim 15, further comprising:
determining that the user is unable to perform the intended step from the plurality of intended steps;
determining that the user is incorrectly engaged in the intended step; and
reconstructing the decision tree, wherein the reconstructed decision tree is associated with an actual intent and a desired action of the user.

19. The computer program product of claim 15, further comprising:
ingesting at least one document from the plurality of knowledge documents and the plurality of relevant sources;
extracting at least one task from the ingested document;
converting the extracted task into a decision tree; and
storing the decision tree in the intent database.

20. The computer program product of claim 16, further comprising:
monitoring a plurality of user's tools by utilizing three-dimensional tracking software; and
determining the intended step of the user based on the monitored plurality of user's tools and recognition software, wherein a piece of training data based on offline training was created for the recognition software.

21. The computer program product of claim 20, further comprising:
creating offline training for a plurality of general tasks;
generating training data associated with the plurality of general tasks from the created offline training;
comparing the created offline training to the monitored user activity; and
associating the intent of the user with the desired action based on the compared offline training and monitored user activity.

* * * * *